Aug. 16, 1949.　　　M. J. LAMPERTI　　　2,479,171
PREPARING FOOD FOR QUICK-FREEZING
Filed Aug. 29, 1945　　　2 Sheets-Sheet 1
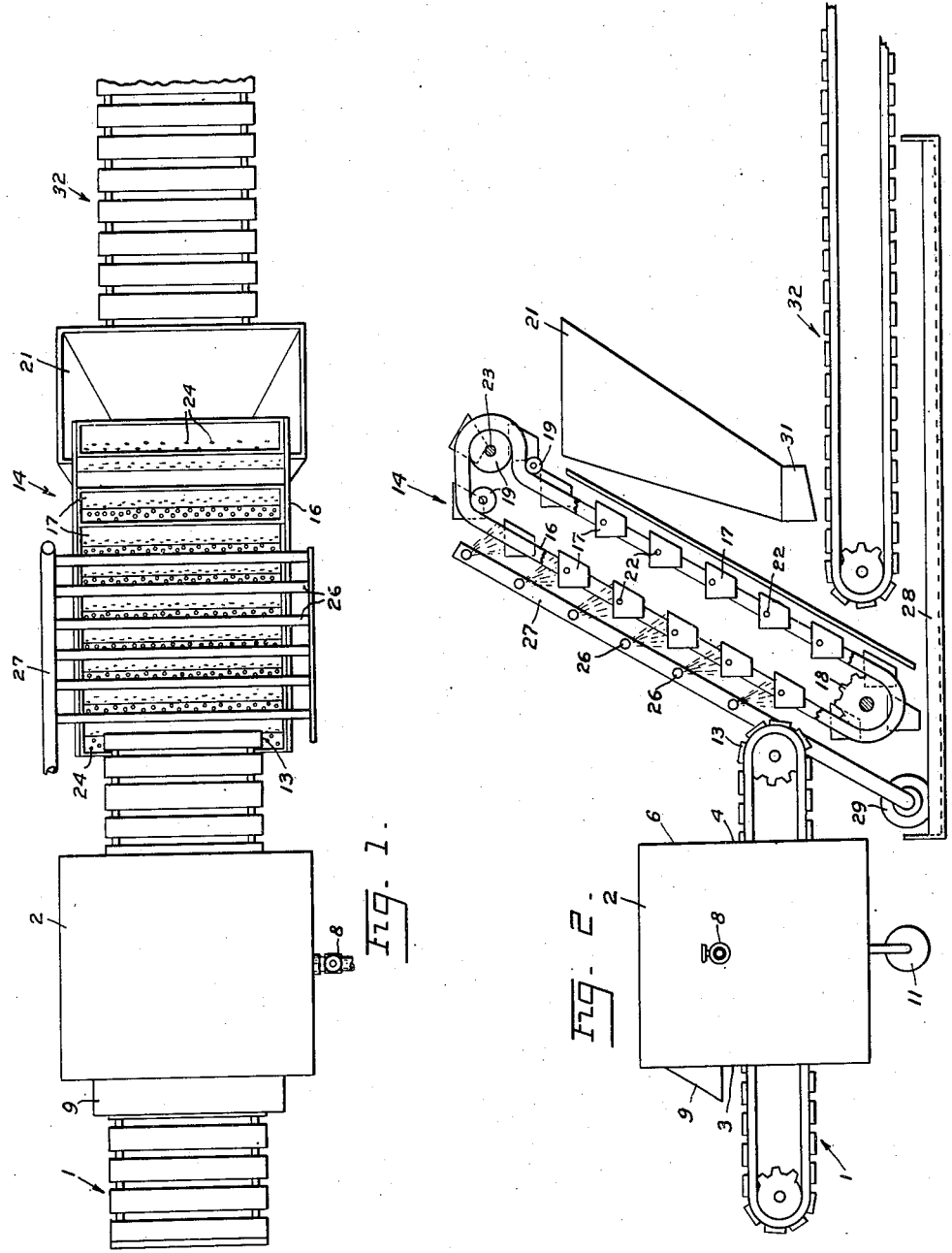
INVENTOR.
MARIO J. LAMPERTI
BY George B White
ATTORNEY Aug. 16, 1949.   M. J. LAMPERTI   2,479,171
PREPARING FOOD FOR QUICK-FREEZING
Filed Aug. 29, 1945   2 Sheets-Sheet 2

INVENTOR.
MARIO J. LAMPERTI
BY George B. White
ATTORNEY

Patented Aug. 16, 1949

2,479,171

UNITED STATES PATENT OFFICE 2,479,171

PREPARING FOODS FOR QUICK FREEZING

Mario J. Lamperti, San Rafael, Calif.

Application August 29, 1945, Serial No. 613,307

3 Claims. (Cl. 99—192)

This invention relates to a method for preparing perishable products for quick freezing.

In order to prepare perishable products such as vegetables or fruit for preserving by quick freezing it is necessary to kill the enzymes on said vegetables or fruit. In the past fruits and vegetables were dipped in boiling water for several minutes, then frozen. Hot water washes out and extracts from such vegetables and fruit a great deal of food and vitamin value. When this was discovered the method was changed, for instance, in connection with apricots, peaches, apples, to cutting the fruit in raw state, putting sugar on it and then quick freezing it without boiling. Such fruit when thawed out oxidized immediately and discolored or browned very rapidly. For instance, pears never were successfully quick frozen by past methods and pear preservation by such freezing methods was abandoned.

The object of my invention is to provide a method and apparatus whereby highly perishable and oxidizable food products such as vegetables and fruits, can be rapidly and simply prepared for quick freezing, with or without syrup coating, and the enzymes destroyed therein, so as to result in a product which resists oxidation while in the frozen state and also after it is thawed out.

Particularly an object of this invention is to provide a method wherein the perishable and oxidizable food product, vegetable or fruit is subjected to steam in a suitable rapid manner, and then rapidly cooled, packaged and quick frozen, so as to kill the enzymes thereon and then quickly preserve it.

Another object of this invention is to provide a method and apparatus which is highly useful and simple in construction. Convenience of arrangement, lightness and comparative inexpense of manufacture are further objects which have been borne in mind in the production and development of the invention.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

The invention is clearly illustrated in the accompanying drawings wherein

Fig. 1 is a diagrammatic plane view of an apparatus for performing my method.

Fig. 2 is a somewhat diagrammatic side view of my apparatus.

Figure 3:
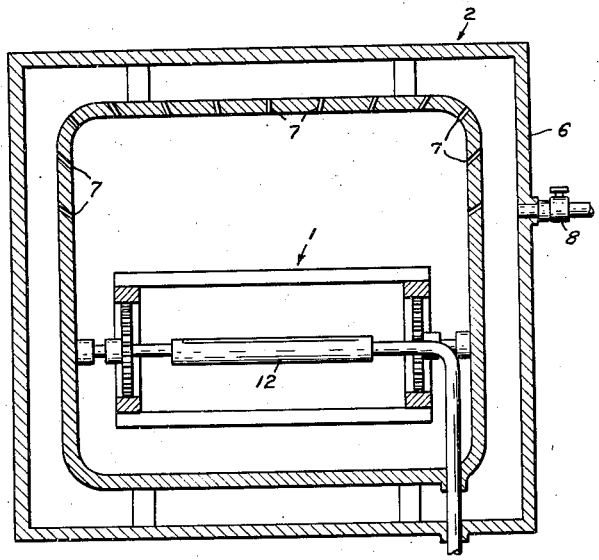
Fig. 3 is a sectional view of the steaming device in my apparatus.
Figures 4, 5:
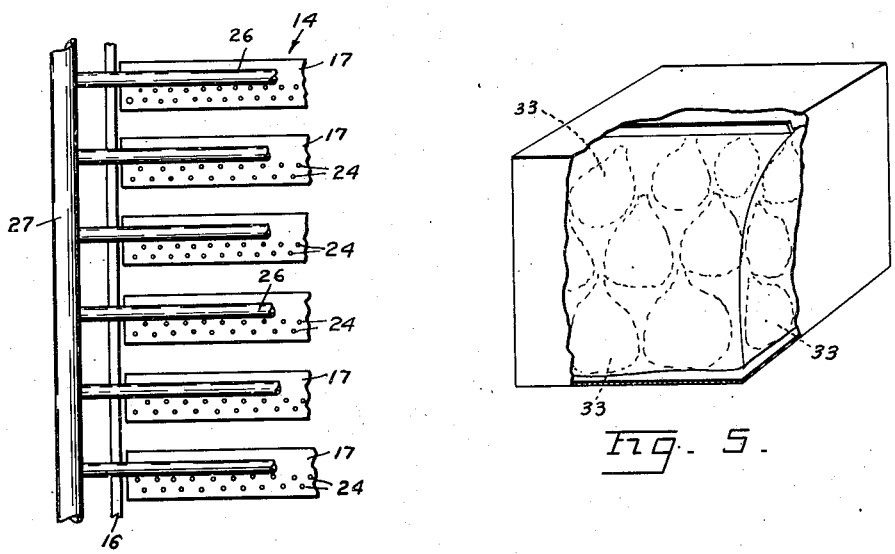
Fig. 4 is a fragmental front view of the spraying and cooling mechanism of my apparatus.
Fig. 5 is a perspective view of the sealing and packaging of the produce.

The steps in my method in main include the rapid exposing of the raw vegetable or fruit to steam, the rapid cooling of the steam treated vegetable or fruit or product, then the packaging, and quick freezing of the product.

The step of steaming is preferably performed by passing the produce through a steam chamber, wherein the produce is subjected to steam jets preferably by drawing the steam onto the produce by suction, for the purpose of steam penetration into the interstices or pores of the produce for killing the enzymes, and for confining the steam within the chamber wherein the steaming is performed.

The rapid cooling is performed immediately after the steaming of the product. In the present illustration this is accomplished by distributing the steamed product into separate bunches or layers and moving them through a cooling medium. This may be combined with the step of coating the product with a liquid coating such as syrup which is separately sprayed onto the layers or bunches of the product while said product is in motion away from the steaming step and toward the packaging step. The cooling or coating medium is continually circulated, suitably cooled and recirculated.

The product is kept in motion while it is further cooled and drained, and thus it is carried to the packaging step where it is hermetically sealed in suitable packages.

The packaged product is then introduced into a suitable quick freezing apparatus and is quick-frozen; then it is stored in suitable refrigerator chambers or containers and is thus kept until needed.

The illustrative form of my apparatus includes a conveyor 1 of a suitable type to carry the product thereon. A substantially intermediate portion of this conveyor 1 is passed through a steaming chamber 2, which is preferably a box having an inlet 3 and an outlet 4. A steam jacket 6 is around the chamber 2. The inner periphery of the steam jacket 6 is provided with a plurality of nozzle apertures 7 directed inwardly and toward the middle portion of the chamber 2 and unto the conveyor 1. Steam is introduced into the jacket 6 through a suitable inlet valve 8. Above the inlet 3 of the chamber 2 is a shield 9 for protecting against upward rise of hot steam from the chamber 2.

Suction for drawing the steam unto the produce is created in the chamber 2 by means of a fan 11 or the like, the intake 12 of which is located at about the middle of the chamber 2 so as to draw the steam toward the middle of the portion of the conveyor 1 and to focus the steam on the product carried thereon.

Adjacent the discharge end 13 of the conveyor 1 is located a suitable distributing and cooling mechanism 14. In the present diagrammatic illustration this mechanism includes a conveyor 16 on which is pivotally supported a series of carriers such as open containers or buckets 17. The conveyor 16 is supported in any suitable manner not shown. In the diagrammatic view herein a sprocket 18 at the lower end of the conveyor 16 transmits rotation to said conveyor 16. The sprocket 18 is driven in any suitable manner not shown. The upper end of the conveyor 16 is guided over pulleys 19 so as to project over a hopper 21 into which the cooled contents of the buckets 17 are dumped. The buckets 17 are long and comparatively narrow so as to expose long transverse layers of the produce to the cooling medium. The pivots 22 on which the buckets 17 are mounted on the conveyor 16 are located above the center of gravity of the respective buckets 17 so that the buckets hang substantially vertically when carried around by the conveyor 16. Suitable means are provided at the top of the upwardly inclined conveyor 16 to turn the buckets 17 upside down when the buckets 17 are carried around the upper offset turn of said conveyor 16. In this illustration the shaft 23 of the largest guide roller 19 is located at a distance from the top of the conveyor less the depth of a bucket 17 so that the bottom of the bucket 17 abuts against and is held by said shaft 23 as the bucket 17 is carried around said guide roller 19, and the bucket 17 is thus prevented to assume its upside down vertical position until after the entire top turn is completed. Thus the bucket 17 turns upside down as it is moved around said largest guide roller 19 and dumps its contents into the hopper 21 therebelow.

Each bucket 17 is open at its top and is perforated on all of its sides and on its bottom, and through these vents or apertures 24 the cooling medium is allowed to escape and drip or flow out from each bucket 17. This provides for the circulation of the cooling medium around the contents of the buckets 17. The cooling medium is suitably blown or sprayed into the buckets 17. In the herein form a plurality of spray conduits 26 are suitably supported on a head 27 and have their nozzle apertures directed toward the buckets 17 throughout the full lengths of said buckets 17. In the present illustration the cooling and coating of the product is performed in the same operation. Namely, the cooling medium is cold syrup which is sprayed onto the contents of the buckets 17 as said buckets 17 are carried upward on the conveyor 16. The syrup flows around the fruit or vegetables in the buckets 17 and then drips out through the apertures 24 and is collected in a suitable cooling pan 28 beneath the apparatus. The feed head 27 for the spray conduits 26 is connected to a suitable pump 29 the intake of which latter sucks the syrup, or other cooling medium, from the pan 28. Thus the cooling medium is recirculated and cooled and sprayed over the product treated. Instead of syrup other coating material, or cooling medium may be employed.

Beneath the outlet 31 of the hopper 21 is another conveyor 32 to receive the cooled product from the hopper 21 and to carry it to a place where the product is packaged preferably in sealed packages, as soon as possible after cooling. The packaged product 33 is then placed in a quick freezing device and is rapidly frozen in the usual manner and then stored under refrigeration until used. It is to be noted that the product is drained both in the hopper 21 and on the discharge conveyor 32. It is also to be noted that the width of the cooler conveyor 16 and the length of the buckets 17 is greater than the width of the steaming conveyor 1 so as to provide for the distribution of the produce into wider layers.

The rapid steaming under vacuum, the immediate quick cooling of the distributed product right after steaming, and the rapid coating and draining, and immediate packaging and quick freezing provide a very successful preserving practice. It was found that food products so treated last better and do not discolor or oxidize in storage and retain their natural fresh color and bouquet long after the product is removed from refrigeration and is thawed out. For instance pears, which could not be successfully handled by quick freezing in the past in any manner heretofore known, are by my method preserved for long periods in refrigeration and retain their natural fresh qualities and color long after thawing out and without any oxidation.

I claim:

1. In the method of preparing food products for quick freezing, the steps of passing the products through steam and drawing said steam by suction unto said products, applying a cooling bath to the steamed product immediately after said steaming, and then immediately packaging and quick freezing said products.

2. In the method of preparing food products for quick freezing, the steps of passing the products through steam and applying suction at said passing products for drawing the steam unto said products.

3. In the method of preparing food products for quick freezing, the steps of passing the products through steam and applying suction at said passing products for drawing the steam unto said products, and then passing said products immediately from said steam to a cooling bath.

MARIO J. LAMPERTI.

REFERENCES CITED

The following references are of record in the file of this patent:

UNITED STATES PATENTS

| Number | Name | Date |
|---|---|---|
| 1,884,429 | Warner | Oct. 25, 1932 |
| 1,931,911 | White | Oct. 24, 1933 |
| 2,145,323 | Stafford | Jan. 31, 1939 |

OTHER REFERENCES

Tressler et al. Freezing Preservation of Foods, Avi. Publishing Co., 1943, pages 198–201 and 362–363.